(12) United States Patent
Larkin (10) Patent No.: US 9,709,755 B2
(45) Date of Patent: Jul. 18, 2017

(54) MULTI-TOOL FOR FIBER OPTIC APPLICATIONS

(71) Applicant: Westek Electronics, Inc., Watsonville, CA (US)

(72) Inventor: Kevin B. Larkin, Pebble Beach, CA (US)

(73) Assignee: Westek Electronics, Inc., Watsonville, CA (US)

( * ) Notice: Subject to any disclaimer, the term of this patent is extended or adjusted under 35 U.S.C. 154(b) by 0 days.

(21) Appl. No.: 15/007,078

(22) Filed: Jan. 26, 2016

(65) Prior Publication Data

US 2016/0216453 A1    Jul. 28, 2016

Related U.S. Application Data

(60) Provisional application No. 62/107,998, filed on Jan. 26, 2015, provisional application No. 62/162,528, filed on May 15, 2015.

(51) Int. Cl.
*G02B 6/38* (2006.01)
*G01M 11/00* (2006.01)

(52) U.S. Cl.
CPC .......... *G02B 6/385* (2013.01); *G02B 6/3827* (2013.01); *G02B 6/3849* (2013.01); *G01M 11/30* (2013.01); *G02B 6/3893* (2013.01)

(58) Field of Classification Search
CPC ..... G02B 6/385; G02B 6/3827; G02B 6/3849
See application file for complete search history.

(56) References Cited

U.S. PATENT DOCUMENTS 5,430,819 A    7/1995  Sizer et al.
5,475,781 A *  12/1995 Chang .................. G02B 6/3879
                                                              385/76

(Continued)

FOREIGN PATENT DOCUMENTS

CN         203705689 U       7/2014

OTHER PUBLICATIONS

ISA/IPO, International Search Report and Written Opinion for International Application No. PCT/US2016/014992, May 9, 2016, 10 Pages.

(Continued)

*Primary Examiner* — Omar R Rojas (57) ABSTRACT

A multi-tool for fiber optic applications is disclosed. In one embodiment, the multi-tool includes a male fiber loopback plug. The multi-tool further includes a fiber coupler having a first end and a second end. The first end of the fiber coupler is able to receive the male fiber loopback plug when the multi-tool is in a closed position. Also, the first end of the fiber coupler is able to receive a loose fiber cable end when the multi-tool is in an open position. The multi-tool also includes an end cap which can be removably coupled to the second end of the fiber coupler. The end cap and the fiber coupler cooperatively provide a protective housing for a fiber cable end when the end cap is removably coupled to the second end of the fiber coupler and the fiber cable end is inserted into the first end of the fiber coupler. Further, the male fiber loopback plug and the fiber coupler collectively make a female fiber loopback plug when the male fiber loopback plug is in a closed position and the end cap is removed from the second end of the fiber coupler. Also, a dust-resistant housing protectively encloses the male fiber loopback plug, the fiber coupler, and the end cap such that the multi-tool is protected from dust intrusion when the male (Continued)

fiber loopback plug is in the closed position and the cap is coupled to the second end of the fiber coupler.

12 Claims, 7 Drawing Sheets

(56) References Cited

U.S. PATENT DOCUMENTS

| | | | |
|---|---|---|---|
| 6,227,717 B1 * | 5/2001 | Ott | G02B 6/3849 |
| | | | 385/134 |
| 6,454,464 B1 | 9/2002 | Nolan | |
| 2013/0045616 A1 | 2/2013 | Adams | |

OTHER PUBLICATIONS

Cabling Installation & Maintenance—Aug. 2015, Aug. 31, 2015, p. 22.

* cited by examiner

MULTI-TOOL FOR FIBER OPTIC APPLICATIONS

CROSS-REFERENCE TO RELATED APPLICATIONS

This application claims priority to and benefit of U.S. provisional patent application 62/107,998, filed Jan. 26, 2015, entitled "FIBER LOOPING PLUG LOCKING HOUSING", by Kevin Larkin, assigned to the assignee of the present application, and is incorporated herein, in its entirety, by reference.

This application claims priority to and benefit of U.S. provisional patent application 62/162,528, filed May 15, 2015, entitled "FIBER LOOPING PLUG LOCKING HOUSING", by Kevin Larkin, assigned to the assignee of the present application, and is incorporated herein, in its entirety, by reference.

BACKGROUND

With the ubiquitous use of fiber optic cables, testing of fiber optic cables and systems has become increasingly common. Unfortunately, fiber optic cabling is highly susceptible to damage from physical contact, scratches, and even dust particles. This sensitivity of fiber optic components presents a particular problem for technicians attempting to perform testing or repairs outside of a protected environment. In some instances, technicians actually travel with a portable "clean room" trailer (splice truck) to attempt to perform remote testing and repairs in a more suitable environment. Such splice trucks are simply not feasible for use in most of the remote locations in which fiber optic testing and repairs are now frequently made. Instead, technicians typically employ a variety of testing tools and devices which are carried by the technician to the site of the needed testing or repair. Specifically, many technicians now carry such various testing tools to remote locations such as, remote vaults, roof tops, and even to the top of 100 foot or higher cell towers. Again, the technician must now travel to these remote locations carrying all of their potentially needed tools with them. Due to the requirement to avoid dirt and contaminates, it is not uncommon for a technician to arrive at a location only to find that the needed tool is either crushed in a tool box, soiled with dust, or contaminated with moisture. Additionally, the technician may determine that they need a tool that they did not bring with them. Now an additional "truck roll" is needed to deliver a new or needed tool, thereby adding additional expense to the process. In addition to the above described issues, it is imperative that the technician also protects any loose fiber cable ends during the testing process. When performing testing operations, it is not uncommon for the end of disconnected fiber optic cable to become scratched or otherwise damaged.

BRIEF DESCRIPTION OF THE DRAWINGS

The drawings referred to in this description should not be understood as being drawn to scale unless specifically noted.

DESCRIPTION OF EMBODIMENTS

Reference will now be made in detail to embodiments, examples of which are illustrated in the accompanying drawings. While the technology will be described in conjunction with various embodiment(s), it will be understood that they are not intended to be limited to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiments. However, embodiments may be practiced without these specific details. In other instances, well known methods, procedures, components, and circuits have not been described in detail as not to unnecessarily obscure aspects of embodiments.

OVERVIEW

Embodiments in accordance with the present invention provide a novel multi-tool which provides a technician with multiple required testing tools packaged in a single dust-resistant housing. Moreover, various embodiments in accordance with the present invention enable a technician to perform testing operations while concurrently storing loose fiber optic cable ends in the very same dust-resistant housing integrated into the novel multi-tool. As such, a technician does not need to carry multiple separate testing tools to a remote site. Instead, embodiments in accordance with the present invention allow a technician to take the single multi-tool to a site and perform the required testing operations, while concurrently allowing the technician to rest assured that disconnected fiber cable ends are being protected from damage.

The discussion that follows will begin with a description of embodiments. The discussion will continue then with a description of embodiments with reference to FIGS. 1-5B.

Embodiments include a multi-tool for fiber optic applications in a dust-resistant housing. For purposes of the present application, a dust-resistant housing means that the housing is sufficiently sealed to prevent an accumulation of dust that would render the various testing tools (i.e. the male fiber loopback plug, the coupler, the protective housing, the female fiber loopback plug) in need of substantial cleaning prior to use. Additionally, in other embodiments in accordance with the present invention, the dust-resistant housing is also crush resistant. Again, for purposes of the present application, a crush resistant housing refers to an embodiment of the present invention where the housing is made with sufficient thickness and rigidity to ensure that the multi-tool is not compromised by being placed in the bottom of a tool box, by being stepped on, or by being subjected to other typical pressures to which a typical technician's tools are subjected. In yet another embodiment, the dust-resistant housing is also fluid resistant. For purposes of the present application, a fluid resistant housing refers to an embodiment of the present invention where the housing is made with sufficient tolerance and tightness of connections to ensure that the multi-tool is not compromised by, for example, being subjected to sweat from a user's hand, experiencing condensation, or spillage of water, coffee, or other fluids as might be experienced by a typical technician's tools.

In various embodiments in accordance with the present invention, the present multi-tool for fiber optic applications achieves its dust-resistant housing by manufacturing the various pieces to fit together utilizing a friction fit approach. This friction fit approach includes but is not limited to press-fitting pieces together, rib-and-valley construction, latches, etc. For example, the male fiber loopback plug may be attached to a section of the "multi-tool for fiber optic applications" that press-fits onto another section of the multi-tool for fiber optic applications. Additional details of the friction fit approaches are provided below.

Embodiments of the present technology address the foregoing problems of conventional technology by creating an inexpensive multi-functional fiber optic test tool that is contained in one dust-resistant housing. While fiber optic test tools are in transport, embodiments in accordance with the present invention keep these tool components clean. In one embodiment, a switch latch mechanism and/or the press fit mechanism is free from traditional moving lever parts and mating sockets are less likely to trap foreign debris and/or moisture. In one embodiment, the multi-tool for fiber optic applications has a switch that includes the depressible section of the housing and a latch/lever mechanism 99 on the male fiber loopback plug. The male fiber loopback plug fits inside the housing. The depressible section of the housing, once depressed, applies pressure to the male fiber loopback plug, and more specifically, the latch/lever mechanism (a latch that is retaining a lever) 99 of the male fiber loopback plug such that upon pressing the depressible section, the latch/lever 99 within the male fiber loopback plug is opened and the male fiber loopback plug is disengaged from the housing. The depressible section is depressible due to, in one embodiment, having a variation in thickness (or variation in material) relative to the rest of the housing wall. In another embodiment, the "depressible section" is the same thickness as the rest of the housing, but has a detent on the inner surface of the housing wall that, upon pressing on the designated "press" area, the detent pushes against the latch/lever 99 of the male fiber loopback plug. It should be appreciated that embodiments include all ways in which a section of the housing may be made depressible such that the latch/lever 99 of the male fiber loopback plug is pressed against to execute an activation of such latch/lever 99, as will be explained below.

The latch/lever mechanism 99 is activated by pressing a molded designated area in the plastic housing case. By pressing this area, the shape and the contour of the case is deformed such that the plastic fiscally presses down and makes contact with the locking/unlocking lever/levers that are common on the fiber optic connectors contained within. These fiber optic connectors are locked into the fiber optic coupler housing molded into/built inside the outer molded plastic case.

The outer case wall thickness is of thinner material that can flex and come in contact with the levers when this action takes place. When this pressure lever action is engaged, the fiber plug lock release levers are now pressed into the unlock mode and released, which allows all the male fiber plugs and dust lid to be removed.

With the dust lid and fiber plugs locked into place, a pressure seal is formed around the exterior edges of the lid and the interior edges of the base. Thus, foreign moisture and dirt is kept out when in use and/or being stored. Embodiments keep the polished end of the male fiber loopback plugs as well as the fiber coupler cavities free from debris.

In one embodiment, the tool case houses three tools in one. On one end of the tool case is a male loop back plug. The male loop back plug, when removed from the case, acts as a separate independent tool. It can be plugged into female sockets to create a signal loop when other hardware or equipment has been taken out of the circuit during testing.

In one embodiment, when the male loop back plug is removed from the case and the dust cover on the opposite end is removed, the case center housing is able to act as a fiber coupler. This fiber coupler can be used to connect like connectorized cords or cables together. It can also be used as attenuators on the line at one end that is opposite the cable. Removing the cables and/or attenuators from the one end of the case that the fiber plug levers are exposed is performed in a manner standard to the industry. To release the cable and/or attenuators plug ends that are on the recessed side of the couple case, the same pressure is performed on the plug case housing in the same area on the case as is performed to release components.

During the process of testing cables and fiber optic equipment, the male loop back plug is removed from the loopback case housing. The fiber optic cable is then unplugged from the equipment jacks to allow for the insertion of the male loop back plug during testing. In the past and to present day before this invention, the unplugged fiber cable and connectors are left to hang freely or stuffed into a shelf area or equivalent. The fragile and sensitive fiber conductors that are exposed from the male plug during this test or process are vulnerable to being scratched or damaged. With the additional claimed feature of this invention the once left loose exposed fiber plug-ins can now be inserted and protected into the vacant male loop back port. This vacant port can be considered a temporary parking lot (i.e. a protective housing) for the plug-ins or one or more loose fiber optic cables. The loose cable and now protected plug-ins can be dropped to the ground or stuffed away without fear of scratching the temporarily unplugged fiber faces.

In one embodiment, and as described herein, the multi-tool for fiber optic applications encloses four different usable tools: a male fiber loopback plug; a female fiber loopback plug; a fiber coupler; and a parking lot (i.e. a protective housing) for one or more loose fiber cables or fiber ferrules. In one embodiment, the present technology is made to distinguish the different modes by something that is readily determined by the user. For example, the multi-tool for fiber optic applications may be of a particular color that signifies a particular type of loopback plug (e.g., multi-mode [red], multi-mode with different type of polish [blue], single mode [yellow], single mode with particularly polished ferrule [green]). Thus, by using something that is readily recognizable, the field technician can readily throw three of the present multi-tools into his/her tool box, flip open the box, and quickly locate the desired type of loopback plug (multi-mode, single mode).

Figure 1:
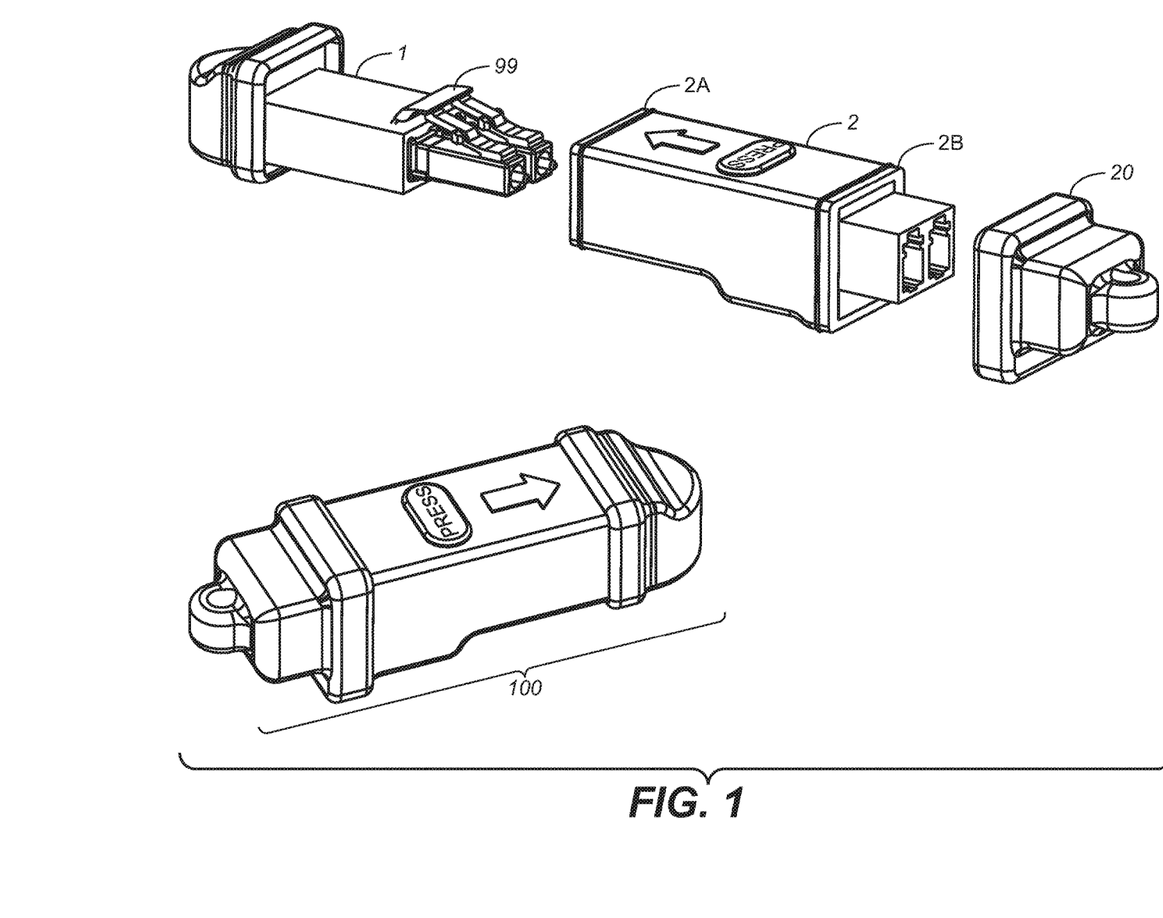
FIG. 1 is an example of a multi-tool for fiber optic applications, in accordance with an embodiment.

FIG. 1 is an example of a multi-tool for fiber optic applications 100, in accordance with an embodiment. Shown in FIG. 1 is a "three tools in one embodiment", which includes a dual LC male fiber loopback plug 1, the dual LC fiber coupler 2 and the end cap 20. Additionally, when male fiber loopback plug 1 is coupled to the first end 2A of coupler 2 a dual LC female fiber loopback plug is created. Additionally, when end cap 20 is coupled to the second end 2B of coupler 2, a protective housing 100 is made which is capable of receiving at least one loose fiber optic cable into the first end 2A of coupler 2. In so doing, a protective housing 100 is created for the at least one loose fiber optic cable, not shown. In one embodiment of the present invention, in addition to being dust-resistant, protective housing 100 is also crush resistant. In yet another embodiment, in addition to being dust-resistant, protective housing 100 is also fluid resistant. Embodiments of the multi-tool for fiber optic applications of FIG. 1 allows for multiple testing scenarios to be carried out.

Figure 2A:
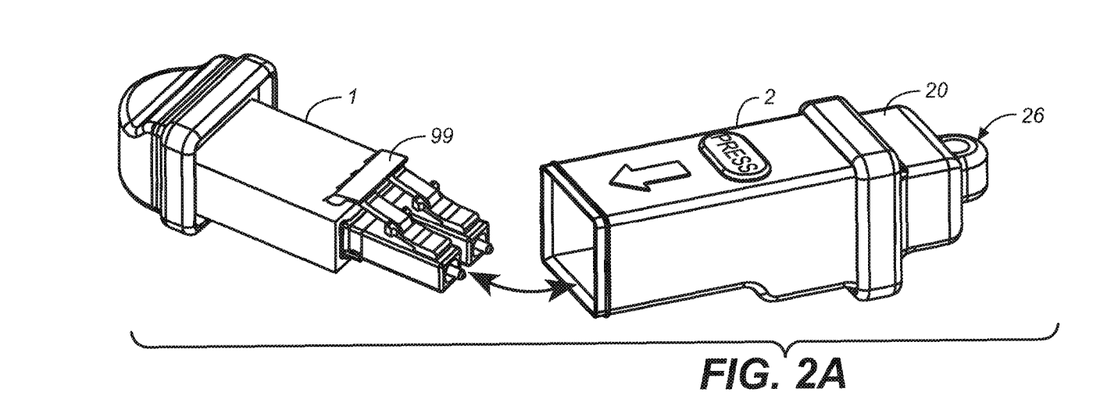
FIGS. 2A, 2B and 2C show an example, in accordance with an embodiment: 2A) the dual LC male fiber loopback plug having been pulled from being housed within the dual LC fiber coupler; 2B) the dual LC fiber coupler; and 2C) the dual LC female fiber loopback plug.
Figure 2B:
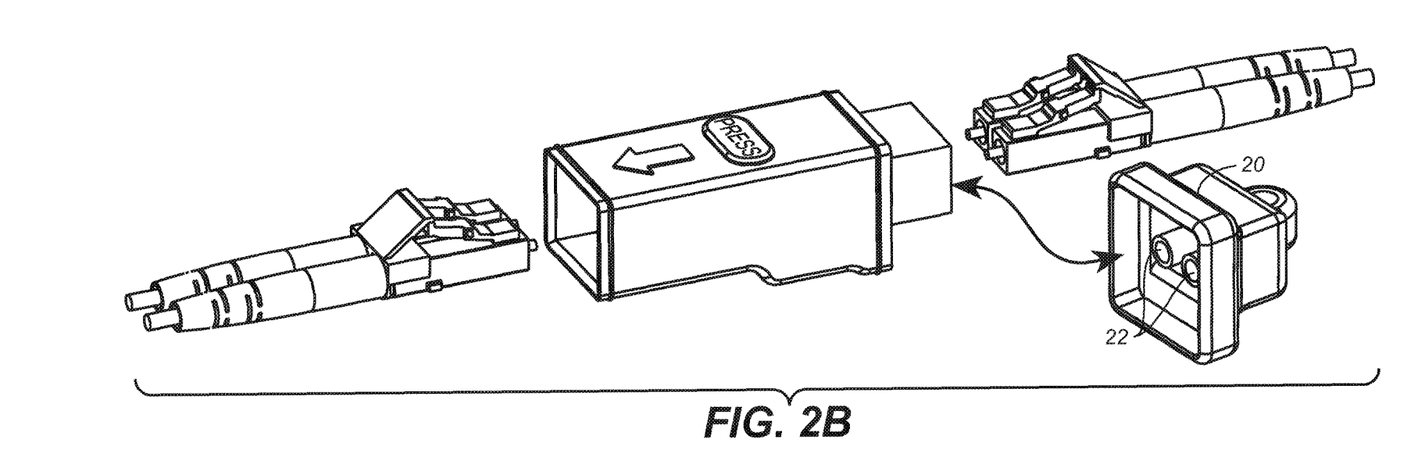
Figure 2C:
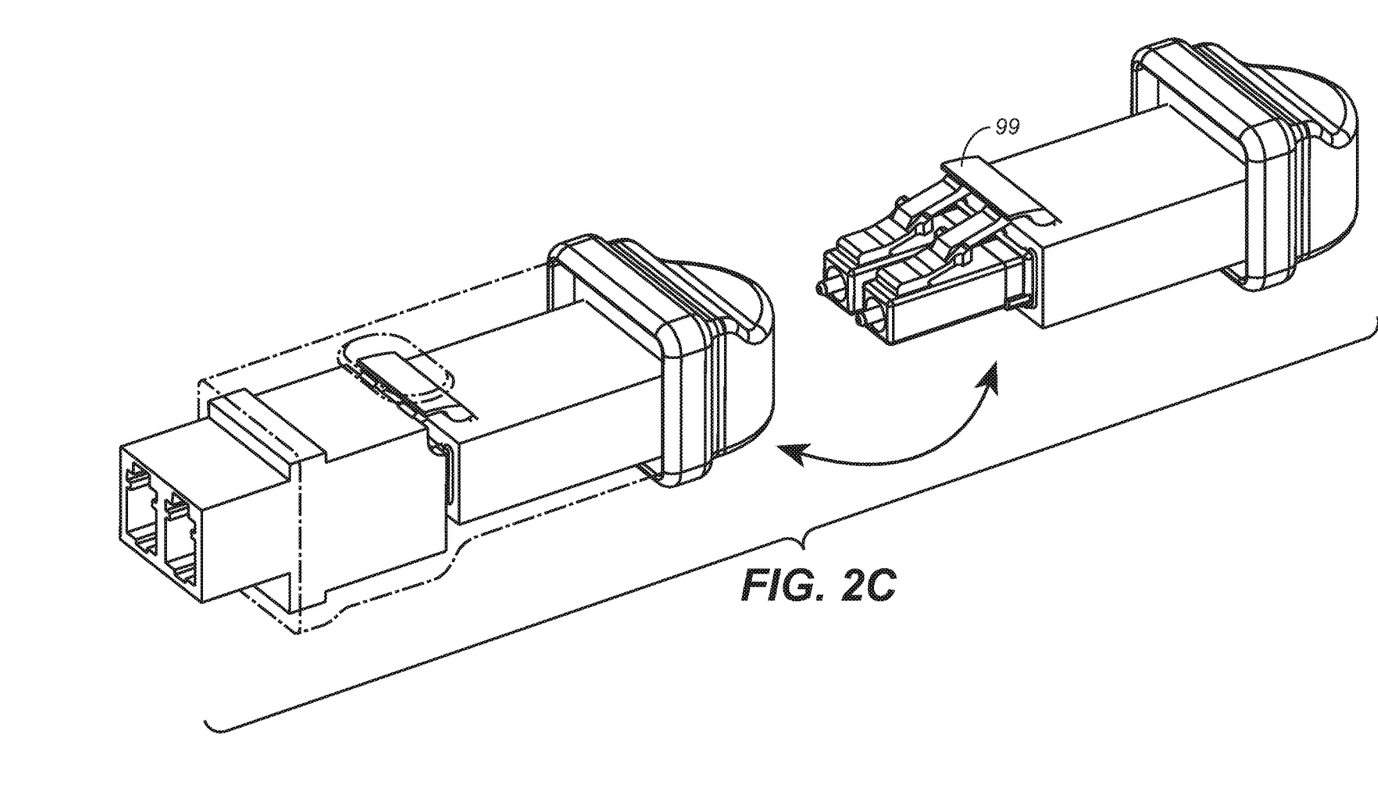

FIGS. 2A, 2B and 2C show an example, in accordance with an embodiment: 2A) the dual LC male fiber loopback plug 1 having been pulled from being housed within the dual LC fiber coupler 2; 2B) the dual LC fiber coupler; and 2C) the dual LC female fiber loopback plug. FIG. 2B shows the end cap 20 removed from the dual LC fiber coupler, such that the dual LC fiber coupler may actually be used as a fiber coupler. FIG. 2C shows the internal component view of the dual LC female fiber loopback plug having been created by the male fiber loopback plug 1 being inserted back into the fiber coupler. FIG. 2C also shows the area in which the depressible section of the multi-tool for fiber optic applications is located. Referring again to FIG. 2B, in one embodiment in accordance with the present invention, end cap 20 further comprises an insertion feature 22 which is removably insertable into the second end 2B of the fiber coupler when end cap 20 is removably coupled to second end 2B of the fiber coupler. More specifically, in one embodiment, the insertion features 22 are rigid posts which extend from the interior surface of end cap 20. When end cap 20 is coupled to second end 2B of the coupler, insertion features 22 extend into corresponding female openings in second end 2B of the coupler. In so doing, embodiments in accordance with the present invention achieve greater structural rigidity. That is, insertion features 22 extend into the female openings in the coupler and prevent end cap 20 from bending as much as is possible without insertion features 22.

Referring again to FIG. 2A, the multi-tool for fiber optic applications further includes a connector 26 coupled to the dust-resistant housing. Connector 26 is configured to enable the multi-tool to be attached to a carrying device such as a lanyard, a key chain, a tool belt, or connected to any other desired item. In so doing, a user or technician can readily carry one or more of the present multi-tools with ease.

Figure 3:
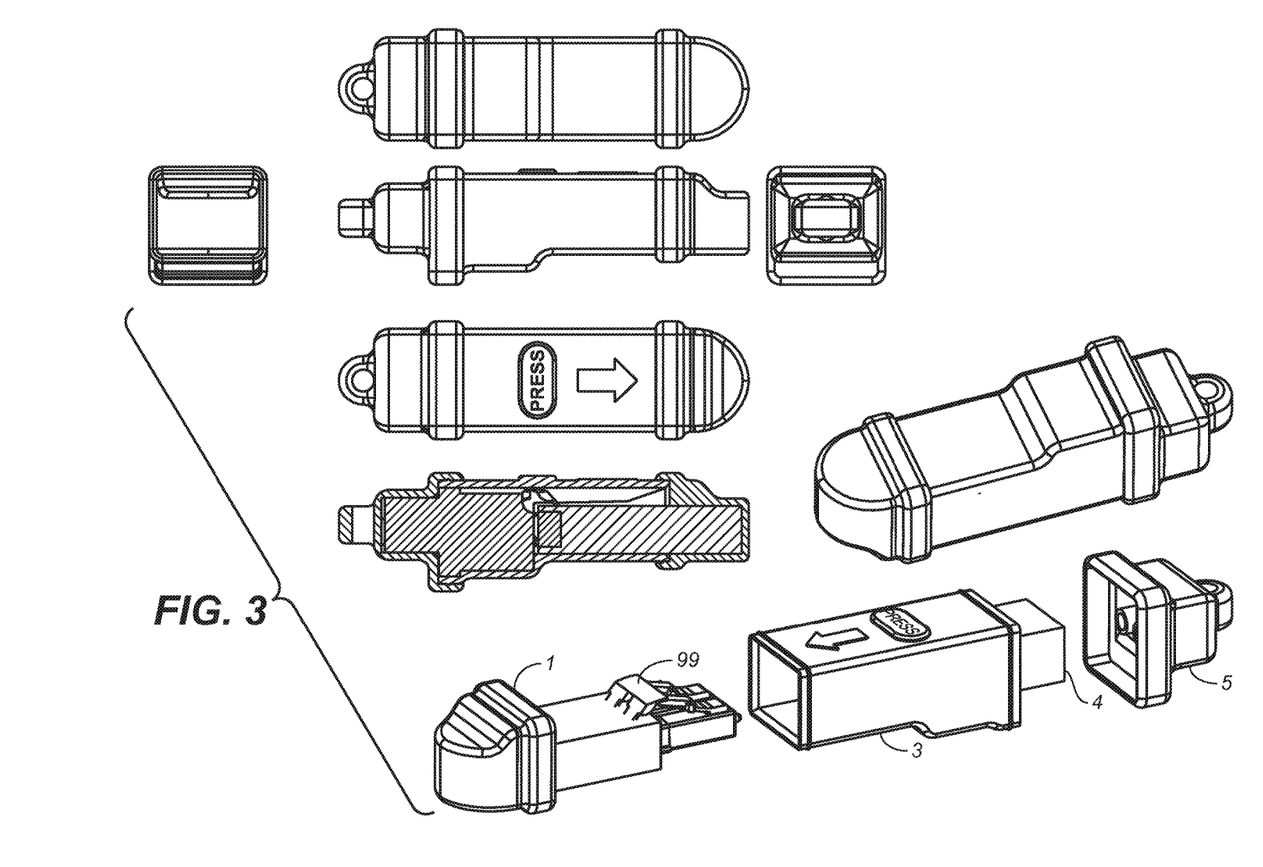
FIG. 3 shows the multi-tool for fiber optic applications of a dual LC single mode as disassembled into its three sections: the dust cover for the dual LC male; the housing of the dual female LC; and the dust cover for the dual LC female, in accordance with an embodiment.

FIG. 3 shows the multi-tool for fiber optic applications of a dual LC single mode as disassembled into its three sections: the dust cover for the dual LC male; the housing of the dual female LC; and the dust cover for the dual LC female, in accordance with an embodiment. Also shown is the LC male fiber loopback plug, SPC single mode and the duplex fiber coupler with ceramic sleeve.

Figure 4:
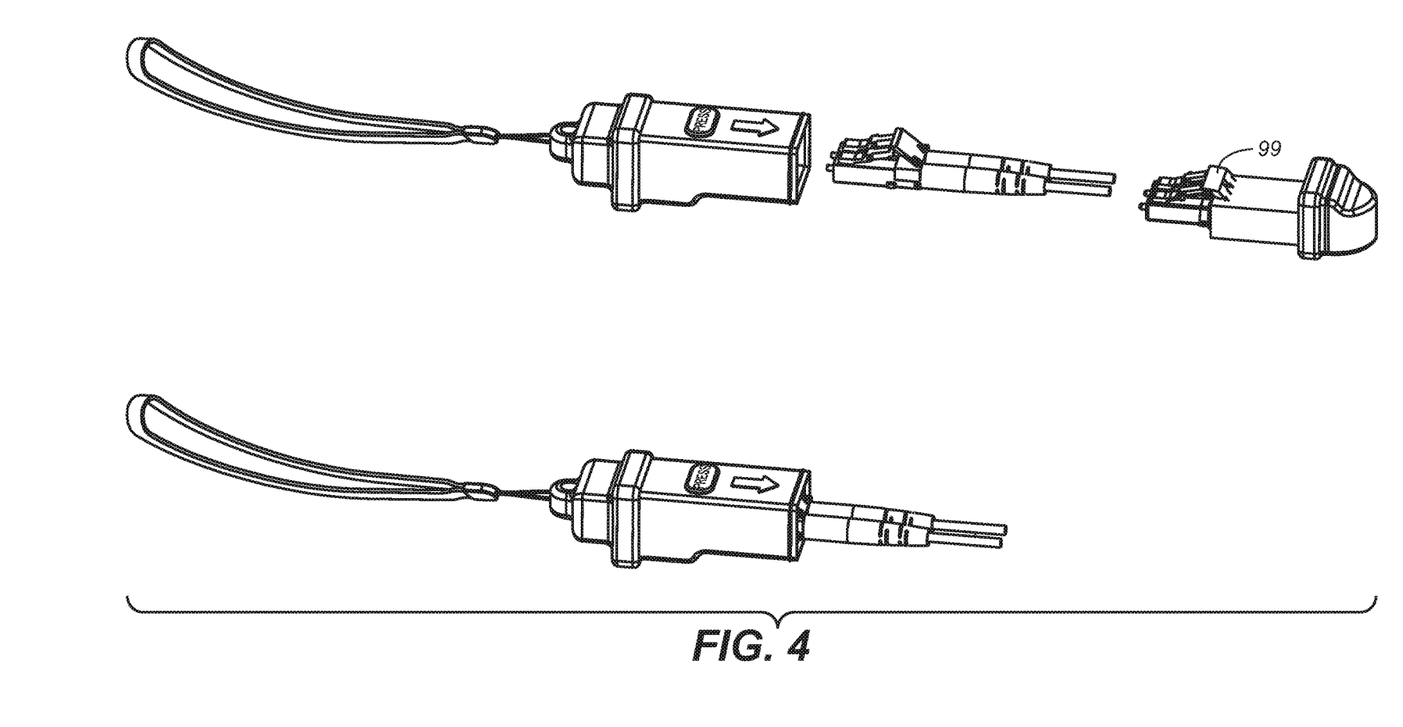
FIG. 4 shows an example of the multi-tool for fiber optic applications in which the male fiber loopback is removed from the other sections of the multi-tool for fiber optic applications, in accordance with an embodiment.

FIG. 4 shows an example of the multi-tool for fiber optic applications in which the male fiber loopback is removed from the other sections of the multi-tool for fiber optic applications, in accordance with an embodiment. Further, the fiber optic plug (that was removed from the equipment in order to make room for the male fiber loopback to be inserted in its place) is inserted into the now vacant loopback port within the multi-tool for fiber optic applications. This enables the fiber optic plug to be protected from dirt and dust and from being scratched during the loopback testing.

Figure 5A:
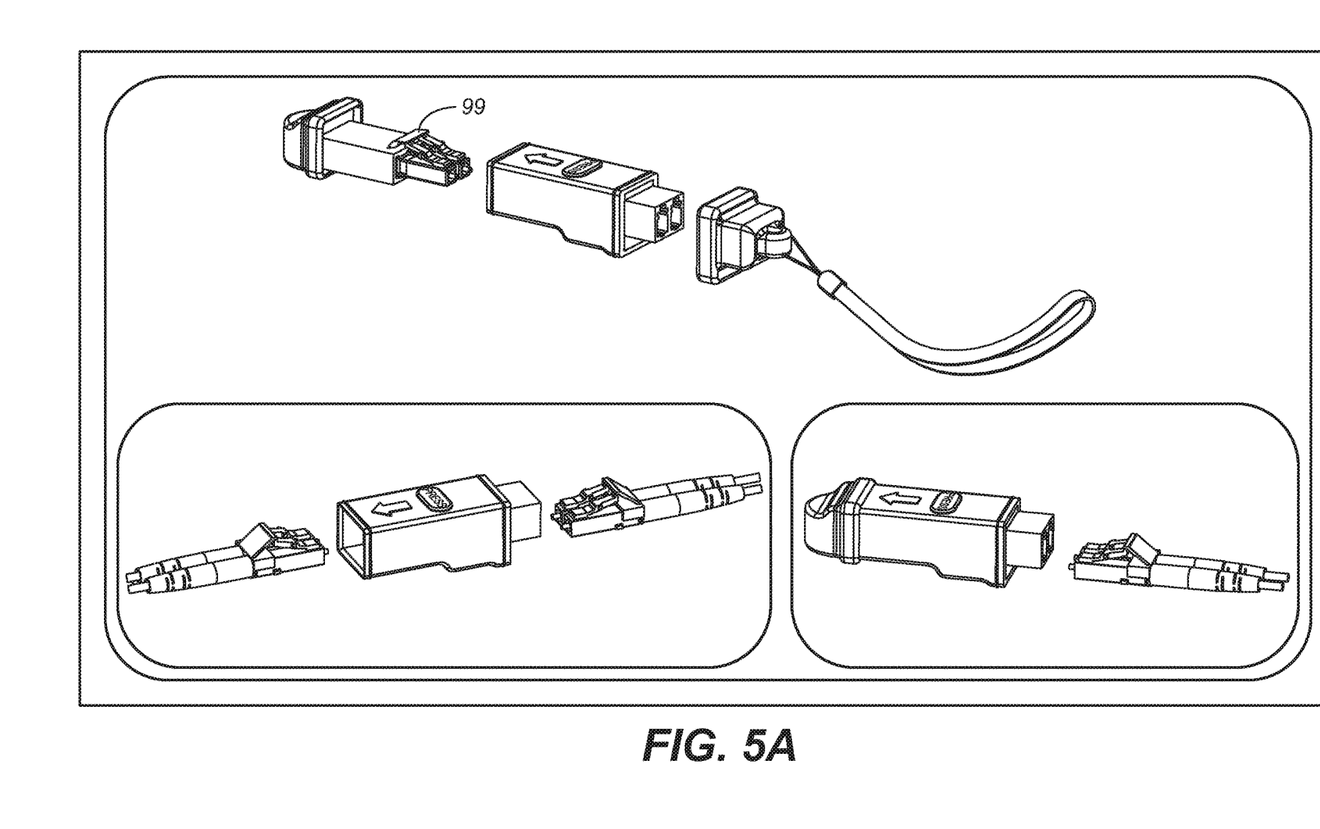
FIGS. 5A and 5B show an LC fiber loopback plug and an SC fiber loopback plug, respectively, in accordance with embodiments.
Figure 5B:
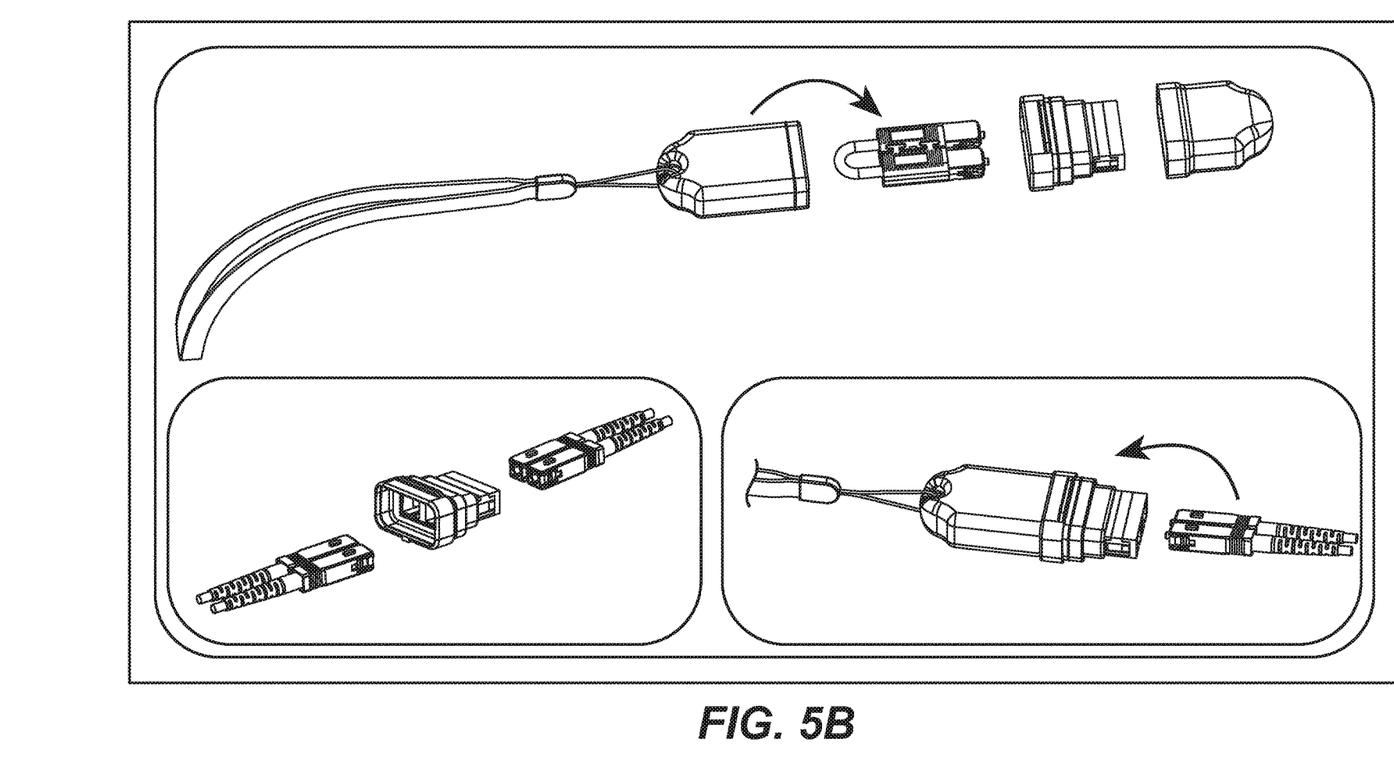

FIGS. 5A and 5B show an LC fiber loopback plug and an SC fiber loopback plug, respectively, in accordance with embodiments. More specifically, FIG. 5A shows the three sections of the multi-tool for fiber optic applications: the dual LC male fiber loopback plug; the dual LC fiber coupler; and the dual LC female fiber loopback plug. Also shown is the dual LC fiber coupler in action, enabling the coupling of male fiber loopback fiber ferrules being connected to both ends of the dual LC fiber coupler. Additionally, the "parking lot" function of the LC fiber loopback plug is shown, with the dual LC female fiber loopback plug removes, exposing a vacant loopback port into which a fiber ferrule may be plugged.

FIG. 5B shows the SC fiber loopback plug disassembled into three sections: a male fiber loopback holder that holds the male fiber loopback plug; the fiber coupler; and the dust cover. The male fiber loopback plug may be removed from the male fiber loopback holder. In one embodiment, two male fiber ferrules may be connected on either end of the fiber coupler. In another embodiment, the fiber coupler may also serve as a parking lot for the fiber ferrules of a fiber optic plug. It is imperative to note that the present invention is well suited to use with any of the numerous types of the fiber optic connectors currently in use. For purposes of brevity and clarity only, the discussions in the present application have been limited to the specific examples of LC and SC connectors. It will be understood by those of ordinary skill in the art that numerous fiber optic connector types are in use. In order to impart the novel aspects of the various embodiments of the present invention and to prevent unnecessarily obscuring those novel aspects, this application has use the LC and SC connectors as examples. More specifically, embodiments in accordance with the present invention are well suited to use with LC, SC, ST, FC, MT-RJ, FDDI-ESCON, OPTI-JACK, VOLITION, LX5, MU, MPO, and various other fiber connector types.

While the foregoing is directed to certain embodiments, other and further embodiments may be implemented without departing from the scope of the present technology, and the scope thereof is determined by the claims that follow.

What I claim is:

1. A multi-tool for fiber optic applications, said multi-tool comprising:
   a male fiber loopback plug;
   a fiber coupler comprising a first end and a second end, said first end of said fiber coupler receiving said male fiber loopback plug when said multi-tool is in a closed position, said first end of said fiber coupler configured to receive at least one loose fiber cable end when said multi-tool is in an open position;
   an end cap configured to be removably coupled to said second end of said fiber coupler, said end cap and said fiber coupler cooperatively providing a protective housing for said at least one fiber cable end when said end cap is removably coupled to said second end of said fiber coupler and said at least one fiber cable end is inserted into said first end of said fiber coupler, said male fiber loopback plug and said fiber coupler collectively comprising a female fiber loopback plug when said male fiber loopback plug is in said closed position and said end cap is removed from said second end of said fiber coupler;
   a dust-resistant housing integrated into said multi-tool, said dust resistant housing protectively enclosing said male fiber loopback plug, said fiber coupler, and said end cap, such that said multi-tool is protected from dust intrusion when said male fiber loopback plug is in said closed position and said cap is removably coupled to said second end of said fiber coupler;

a depressible portion in said dust-resistant housing, said depressible portion disposed proximate where said male fiber loopback plug couples to said first end of said fiber coupler when said multi-tool is in said closed position, said depressible portion configured for being manually depressed; and a latch mechanism coupled to said male fiber loopback plug, said latch mechanism disposed on said male fiber loopback plug such that said latch mechanism resides proximate said depressible portion when said multi-tool is in said closed position, said latch mechanism configured to enable said multi-tool to be placed in said open position by manually depressing said depressible portion, activating said latch mechanism, and removing said male fiber loopback tool from said first end of said fiber coupler.

2. The multi-tool for fiber optic applications of claim 1, wherein said dust-resistant housing is crush resistant.

3. The multi-tool for fiber optic applications of claim 1, wherein said dust-resistant housing is fluid resistant.

4. The multi-tool for fiber optic applications of claim 1, wherein said male fiber loopback plug comprises an SC fiber loopback plug.

5. The multi-tool for fiber optic applications of claim 1, wherein said male fiber loopback plug comprises an LC fiber loopback plug.

6. The multi-tool for fiber optic applications of claim 1, wherein said dust-resistant housing has a color that signifies that said multi-tool is suited for a particular type of fiber optic application.

7. The multi-tool for fiber optic applications of claim 1, wherein said male fiber loopback plug is removably coupleable to said fiber coupler via a press fit mechanism.

8. The multi-tool for fiber optic applications of claim 1, wherein said end cap is removably coupleable to said second end of said fiber coupler via a press fit mechanism.

9. The multi-tool for fiber optic applications of claim 1, wherein said end cap further comprises:

an insertion feature which is removably insertable into said second end of said fiber coupler when said end cap is removably coupled to said second end of said fiber coupler.

10. The multi-tool for fiber optic applications of claim 1, further comprising:

an connector coupled to said dust-resistant housing, said connector configured to enable said multi-tool to be attached to a carrying device.

11. The multi-tool for fiber optic applications of claim 7, wherein said press fit mechanism is comprised of a rib-and-valley construction.

12. The multi-tool for fiber optic applications of claim 8, wherein said press fit mechanism is comprised of a rib-and-valley construction.

* * * * *